United States Patent [19]

Watanabe

[11] Patent Number: 5,499,252
[45] Date of Patent: Mar. 12, 1996

[54] CD-ROM DECODER HAVING MEANS FOR READING SELECTED DATA FROM A CD INTO A MEMORY

[75] Inventor: Tomofumi Watanabe, Gifu, Japan

[73] Assignee: Sanyo Electric Co., Ltd., Osaka, Japan

[21] Appl. No.: 149,981

[22] Filed: Nov. 10, 1993

[30] Foreign Application Priority Data

| Nov. 20, 1992 | [JP] | Japan | 4-312009 |
| Nov. 26, 1992 | [JP] | Japan | 4-317537 |

[51] Int. Cl.⁶ ............................................. G11B 20/18
[52] U.S. Cl. ........................... 371/40.1; 369/32; 369/33; 371/37.5
[58] Field of Search ..................... 371/40.1, 37.5; 369/32, 33, 59, 47

[56] References Cited

U.S. PATENT DOCUMENTS

| 4,587,643 | 5/1986 | Monen et al. | 369/32 |
| 4,631,714 | 12/1986 | Kahlman et al. | 369/59 |
| 4,802,152 | 1/1989 | Markvoort et al. | 369/32 |
| 4,932,018 | 6/1990 | Nagasawa et al. | 369/59 |
| 4,944,323 | 8/1990 | Yoshida | 369/32 |
| 5,159,143 | 10/1992 | Emi et al. | 84/645 |
| 5,220,551 | 6/1993 | Tateishi et al. | 369/50 |
| 5,224,081 | 6/1993 | Muraoka et al. | 369/32 |
| 5,245,600 | 9/1993 | Yamauchi et al. | 369/49 |
| 5,282,186 | 1/1994 | Yoshio et al. | 369/48 |
| 5,359,582 | 10/1994 | Kim | 369/47 |

OTHER PUBLICATIONS

Fujita, Jihei, et al., "CD–ROM Drive System Development", Sanyo Technical Review, vol. 19, No. 1, Feb. 1987, pp. 34–45.

*Primary Examiner*—Stephen M. Baker
*Attorney, Agent, or Firm*—Loeb and Loeb

[57] ABSTRACT

A CD-ROM decoder comprising a DSP interface, an error correcting portion or a RAM access portion, a host interface, and a subcode reading portion. A control microcomputer and a buffer RAM are connected to the CD-ROM decoder. The DSP interface subjects CD-ROM data to a descrambling processing and writes it into the buffer RAM. After code errors of the CD-ROM data written into the buffer RAM are corrected, the CD-ROM data is output from the host interface to a host computer. The subcode reading portion reads subcode data for 98 frames and writes it into the buffer RAM. The subcode data is output from the host interface to the host computer. The subcode data is transferred not through the control microcomputer but directly to the host computer. Alternatively, the RAM access portion reads selected CD-ROM data from the host interface into the buffer RAM. As a result, the load applied to the control microcomputer for controlling the operation of the CD-ROM decoder is reduced.

4 Claims, 5 Drawing Sheets

CD-ROM DECODER HAVING MEANS FOR READING SELECTED DATA FROM A CD INTO A MEMORY

BACKGROUND OF THE INVENTION

1. Field of the Invention

The present invention relates to a CD-ROM decoder for correcting code errors of the digital data which is read from a recording medium.

2. Description of the Related Art

In a conventional CD-ROM system used for a digital audio apparatus in which a compact disk (CD) is utilized as a read-only memory for digital data, the digital data read from the disk is subjected to dual correction processing in order to correct code errors of the data and to enhance the reliability of the data. The dual correction processing is composed of a first correction process executed by the reproducing unit and a second correction process executed by the CD-ROM decoder which is connected to the reproducing unit.

FIG. 5 is a block diagram of the structure of a CD-ROM system.

A pickup portion 1 for detecting the light projected onto and reflected from a compact disk reads the digital data written on a disk and serially outputs the digital data in accordance with a predetermined format.

A digital signal processor 2 processes the digital data which is input from the pickup portion 1 in accordance with a CD format, and supplies the thus-obtained CD-ROM data to a CD-ROM decoder 3.

The digital signal processor 2 has a compatibility with the CD system for a digital audio apparatus, and executes the demodulation of 14-bit digital data into 8-bit data, and the detection of an error of the code based on a Reed-Solomon code, etc.

At the same time, the digital signal processor 2 separates subcode data from the digital data which is input from the pickup portion 1 and inputs the subcode data into a control microcomputer 4 for controlling CD-ROM decoder 3.

One block of the CD-ROM data which is output from the digital signal processor 2 is composed of 24 bytes ×98 frames =2352 bytes. To state this more concretely, 12 bytes are allotted to a synchronous idle, 4 bytes to a header, 2048 bytes to a user data, 4 bytes to an error detection code EDC, and 276 bytes to an error correction code ECC. In one block of the CD-ROM data, all the bytes except the 12 bytes of the synchronous idle, i.e., 2340 bytes are subjected to scrambling processing, and they are restored to the original data by descrambling processing at the time of reproduction.

The CD-ROM decoder 3 is composed of a DSP interface 5 for receiving the CD-ROM data from the digital signal processor 2, an error correcting portion 6 for detecting and correcting code errors of the CD-ROM data which are over-looked by the digital signal processor 2, and a host interface 7 for supplying the CD-ROM data to a host computer after the end of predetermined processing. The operation of each of these elements 5, 6 and 7 is controlled by the control microcomputer 4. The DSP interface 5 not only functions as an interface with respect to the digital signal processor 2, but also detects the synchronous idle of the CD-ROM data, creates a system clock for determining the operation timing of each element, restores the CD-ROM data to the original data by descrambling it and writes the restored CD-ROM data to a buffer RAM 8 which is connected to the CD-ROM decoder 3. The error correcting portion 6 fetches each block (98 frames) of the CD-ROM data which is written into the buffer RAM 8 by the DSP interface 5, corrects the data on the basis of the error detection code EDC and the error correction code ECC, and writes the correct data into the buffer RAM 8. The host interface 7 reads the CD-ROM data which is written into the buffer RAM 8 by the error correction portion 6 and supplies it to the host computer, and supplies various commands received from the host computer to the control microcomputer 4.

The control microcomputer 4 is composed of what is called a one-chip microcomputer containing a ROM and a RAM so as to control the operation of the CD-ROM decoder 3 in accordance with the control program stored in the ROM and temporarily store a command data which is input from the host computer through the host interface 7 and the subcode data which is input from the digital signal processor 2 separately from the CD-ROM data. Therefore, the control microcomputer 4 not only operates the CD-ROM decoder 3 in response to the instruction from the host computer, but also transfers the subcode data for every 98 frames in a predetermined format to the host interface 7 so that it is supplied to the host computer.

Since the control microcomputer 4 not only controls the operation of each element of the CD-ROM decoder 3 but also reads the subcode data, the jobs nearly reach the limit of the throughput of the control microcomputer 4. In addition, since it is difficult to increase the capacity of the RAM provided in the control microcomputer 4, the amount of data stored in the control microcomputer 4 is limited. It is therefore impossible to accommodate increasing subcode data and an increasing number of commands supplied from the host computer. In the case of applications such as CD graphics in which image data is dealt with as subcode data, since continuous processings of the subcode data are required, the load applied to the control microcomputer 4 increases.

In a conventional CD-ROM decoder, the three steps of writing the CD-ROM data read from the digital signal processor 2 into the buffer RAM 8, correcting code errors of the data, and transferring the corrected data to the host computer are generally executed in real time. For this reason, the operations of writing and reading new data into and from the buffer RAM 8 are constantly repeated, so that it is substantially difficult to store specific data in the buffer RAM 8 for a long period.

For example, a table-of-contents data which is called TOC is stored in the innermost periphery of a CD, and since the CD-ROM decoder 3 accesses the data by utilizing the TOC, it is desirable to constantly store the TOC in the CD-ROM decoder 3.

SUMMARY OF THE INVENTION

Accordingly, it is a first object of the present invention to provide a CD-ROM decoder which is capable of reducing the load applied to a control microcomputer so as to enable a high-speed operation.

It is a second object of the present invention to provide a CD-ROM decoder which is capable of storing, for a desired period, specific data of the CD-ROM data which needs to be stored.

To achieve the first aim, in a first aspect of the present invention, there is provided a CD-ROM decoder comprising: an input interface circuit for fetching ROM data and writing it into a memory; a subcode reading circuit for fetching subcode data and writing it into the memory; an error correcting circuit for reading from the memory the ROM data which is written by the input interface circuit, detecting and correcting code errors included in the ROM data, and writing the correct data into the memory; and an output, or host interface circuit for reading from the memory the ROM data which is written by the error correcting circuit and the subcode data which is written by the subcode reading circuit, and supplying these data to a data processing circuit.

According to this CD-ROM decoder, since the subcode data reading circuit is incorporated into the CD-ROM decoder, it is possible to store the read subcode data directly in the memory which is connected to the CD-ROM decoder, so that the load applied to a control microcomputer when processing the subcode data is reduced.

It is preferable to divide the storage region of the memory into a region for the subcode data and a region for the ROM data. This system is called an address division system.

It is further preferable that the memory is used as a time-sharing memory. In this case, since the memory stores either the subcode data or the ROM data at any one time, a storage region smaller than that of the memory of an address division system suffices.

To achieve the second aim, in a second aspect of the present invention, there is provided a CD-ROM decoder for receiving digital data which has been subjected to signal processing by a digital signal processor in accordance with a predetermined format, correcting code errors of the digital data, and supplying the correct data to the data processing circuit, the CD-ROM decoder comprising: an input interface circuit for fetching ROM data from the digital signal processor and writing it into a memory; an error correcting circuit for reading from the memory the ROM data which is written by the input interface circuit, detecting and correcting code errors included in the ROM data, and writing the correct data into the memory; an output interface circuit for reading from the memory the ROM data which is written by the error correcting circuit, and supplying it to a data processing circuit; and a memory access circuit, or RAM access portion, for fetching a part of the ROM data which is output from the output interface circuit and reloading it into the memory.

According to this CD-ROM decoder, since the memory access circuit for writing data directly to the memory which repeats the operations of writing and reading the ROM data is incorporated into the CD-ROM decoder together with the error correcting circuit and the interface circuit, it is possible to extract specific data from the CD-ROM data which are output to the data processing circuit after predetermined processing and to store the specific data from the memory access circuit to the memory. The data is written from the memory access circuit to the memory in accordance with an instruction from a microcomputer which is connected to the CD-ROM decoder so as to control the operations of each interface circuit and the error correcting circuit. It is also preferable to use a memory of an address division system, as described above.

The above and other objects, features and advantages of the present invention will become clear from the following description of the preferred embodiments thereof, taken in conjunction with the accompanying drawings.

DESCRIPTION OF THE PREFERRED EMBODIMENTS

First embodiment

Figure 1:
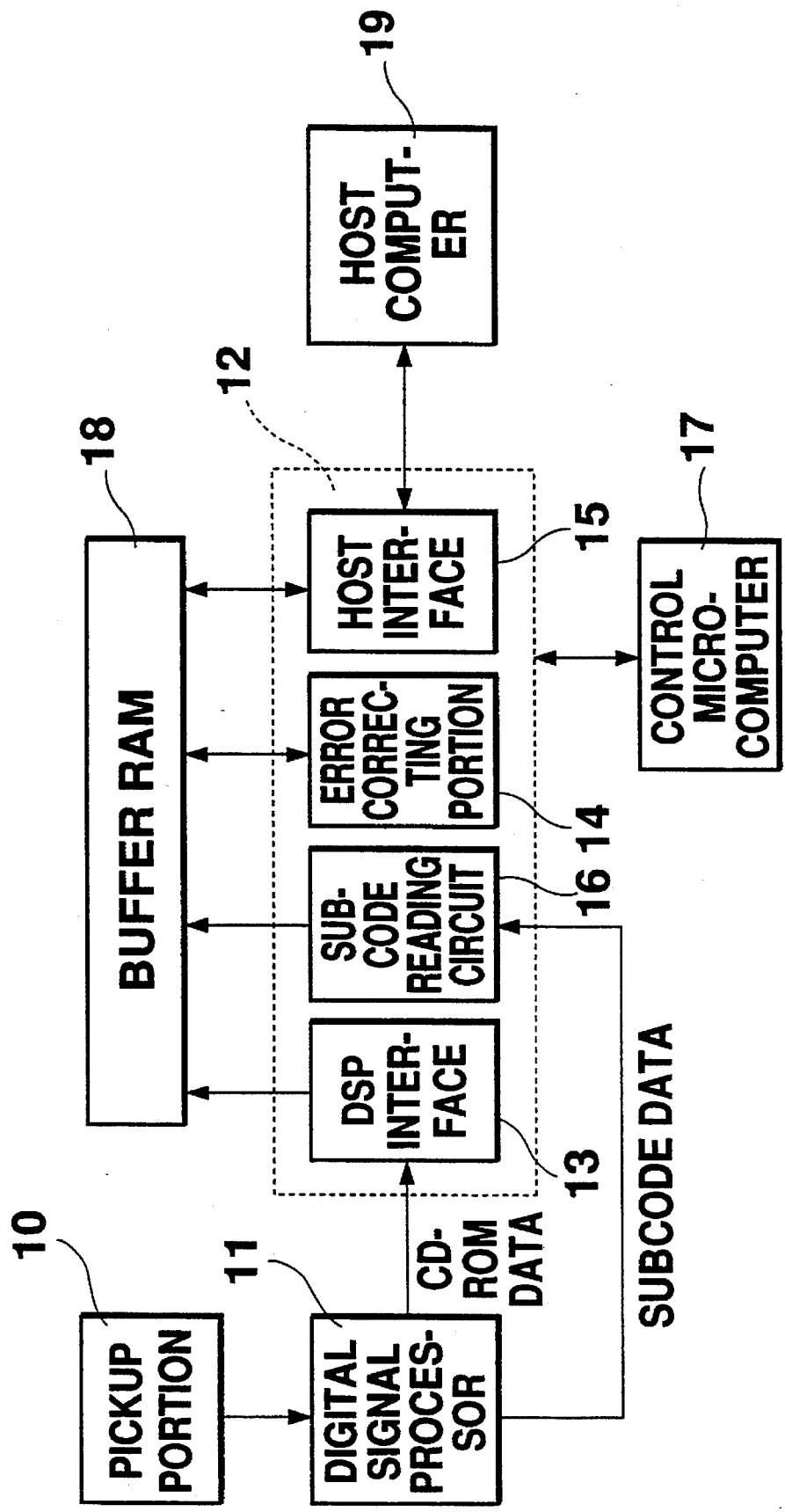
FIG. 1 shows the block diagram of the structure of a CD-ROM system utilizing an embodiment of a CD-ROM decoder according to the present invention.

FIG. 1 is a block diagram of a CD-ROM system utilizing an embodiment of a CD-ROM decoder according to the present invention.

Figure 2:
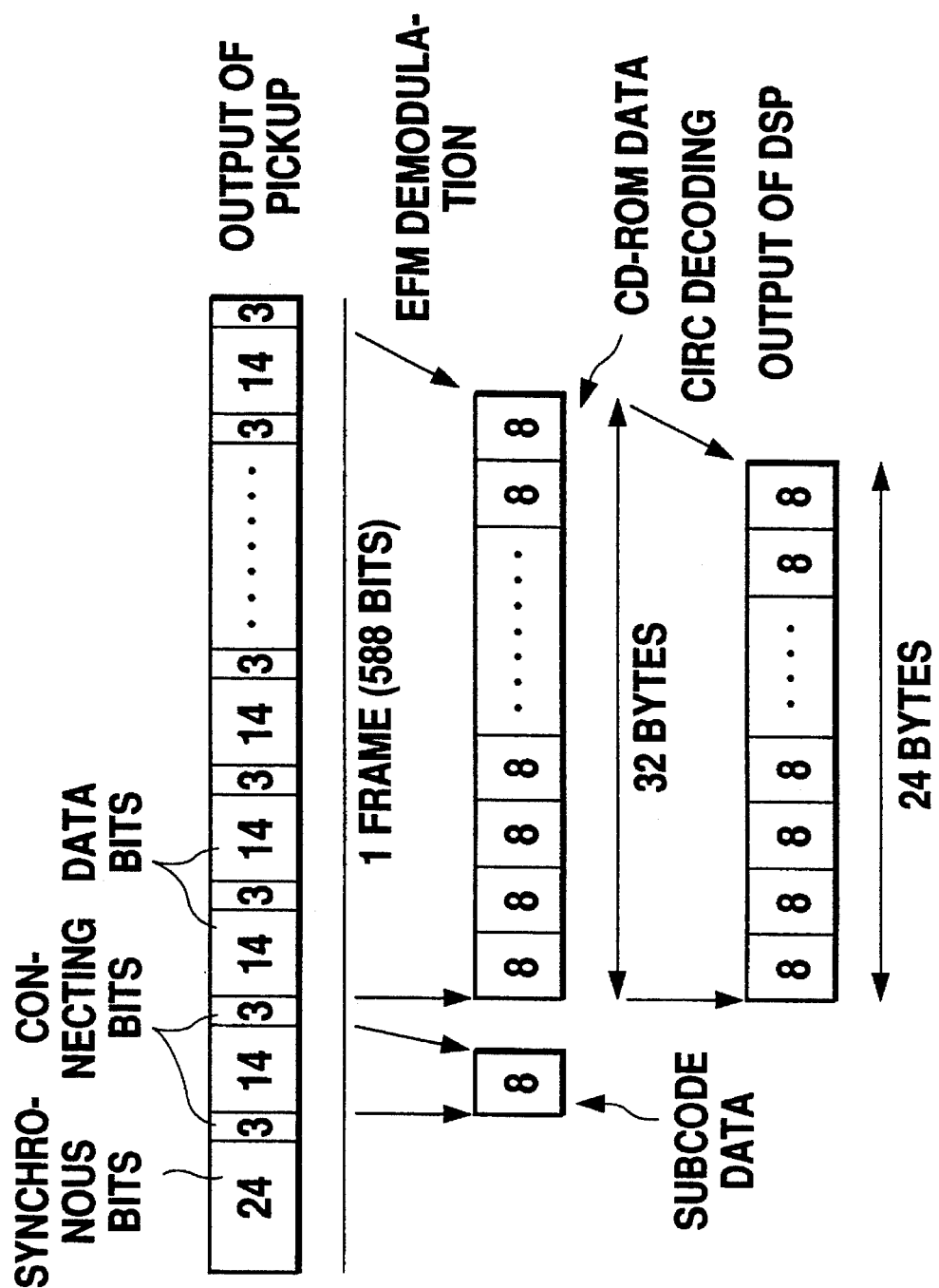
FIG. 2 shows the state of data which is read from a disk.
Figure 6:
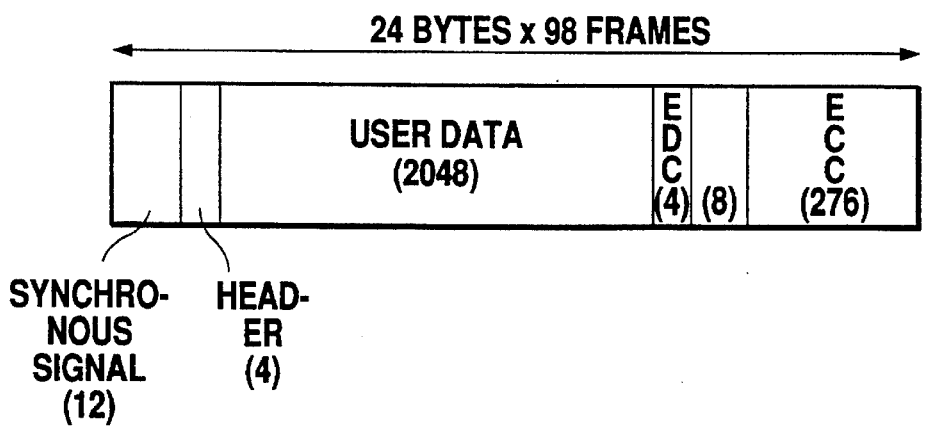
FIG. 6 shows the format of CD-ROM data.

A pickup portion 10 reads data written on a disk by detecting the light reflected from the disk, and outputs digital data having 588 bits per frame. In each frame of the digital data, the first 24 bits are allotted to synchronous bits, and thereafter 14 bits are repeatedly allotted to data bits with connecting bits, composed of 3 bits each therebetween, as shown in FIG. 2. The digital data is input from the pickup portion 10 to a digital signal processor 11, and subjected to EFM (Eight to Fourteen Modulation) demodulation so as to be converted from 14-bit data into 8-bit data. The EFM is a modulating method for modulating 8-bit data to 14-bit data and recording it on a disk. When writing data on a disk, the EFM modulates the 8-bit data to 14-bit data, and when reproducing the data, it demodulates the 14-bit data into 8-bit data. At the time of EFM demodulation, 8-bit subcode data is derived from the first 14-bit data bits which are subsequent to the synchronous bits and 32-byte CD-ROM data is derived from the remaining data bits. These data are dealt with independently of each other. The 32-byte CD-ROM data is then subjected to an error correcting processing called CIRC (Cross-Interleave Reed-Solomon Code) decoding, so that CD-ROM data having 24 bytes per frame is finally produced. The CD-ROM data is supplied to a CD-ROM decoder 12. One block of the CD-ROM data is composed of 98 frames (2352 bytes) having a predetermined format containing bytes which show a synchronous signal and a header, as shown in FIG. 6.

Figure 5:
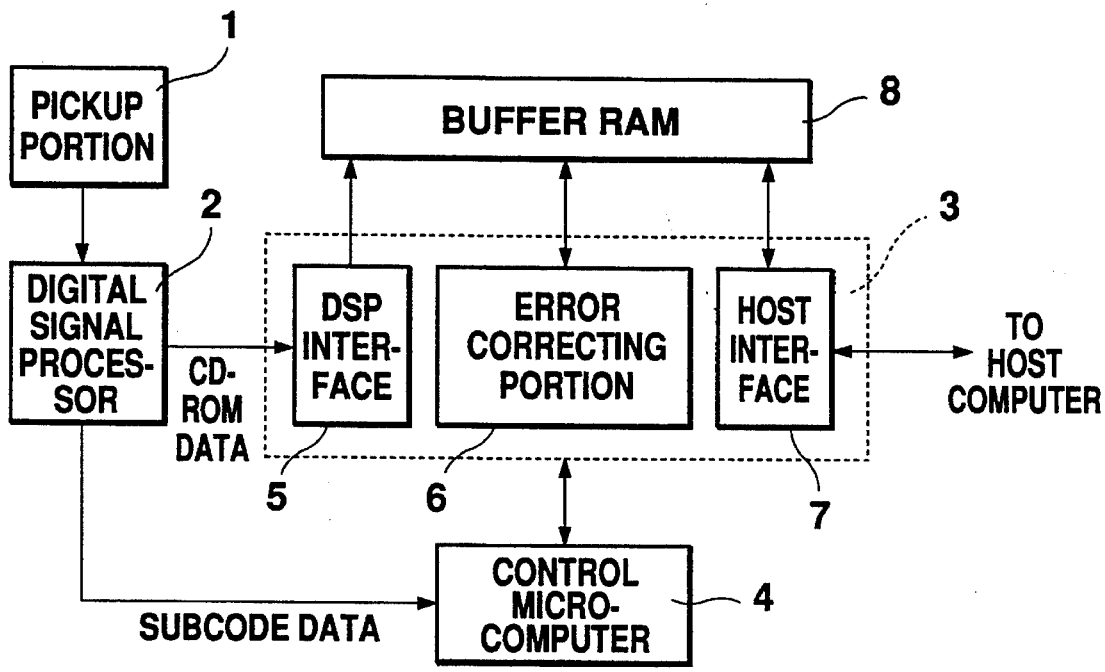
FIG. 5 is a block diagram of the structure of a conventional CD-ROM system.

The CD-ROM decoder 12 includes a DSP interface 13 for receiving the CD-ROM data, an error correcting portion 14 for detecting and correcting code errors of the CD-ROM data, a host interface 15 for supplying the CD-ROM data to a host computer after the end of predetermined processing, and a subcode reading circuit 16 for receiving the subcode data. Each of these elements 13, 14, 15, and 16 is controlled in accordance with the instruction from a control microcomputer 17 so as to operate at a predetermined timing. The DSP interface 13, the error correcting portion 14 and the host interface 15 are the same as those of the CD-ROM decoder 3 shown in FIG. 5. The CD-ROM data which is descrambled by the DSP interface 13 is written into a buffer RAM 18. After an error of the code of the CD-ROM data is corrected by the error correcting portion 14, the CD-ROM data is output to a host computer 19 through the host interface 15.

Figure 3:
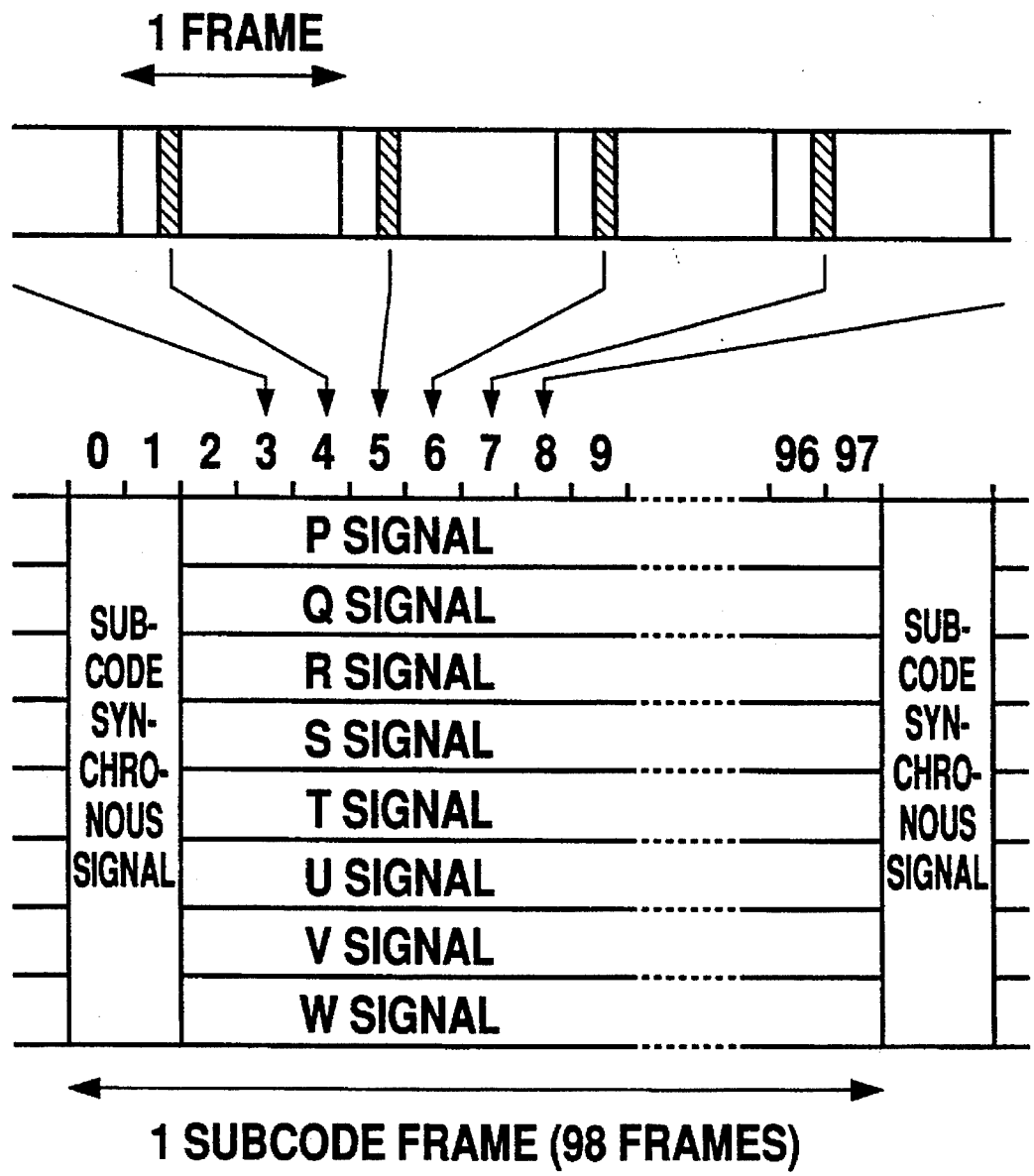
FIG. 3 shows the state of sub code data.

The CD-ROM decoder 12 of the first embodiment is characterized in that it incorporates the subcode reading circuit 16 for reading the subcode data so as to write the CD-ROM data directly from the CD-ROM decoder 12 to the buffer RAM 18. The subcode data of 8 bits per frame is output from digital signal processor 11, and the subcode data for 98 frames constitute one subcode frame which represents specific information. In other words, the subcode reading circuit 16 fetches the subcode data every time the subcode data for 98 frames are output from the digital signal processing circuit 11, and eight kinds of signals P to W each having 98 bits (2 bits thereof are allotted to the synchronous signal) are obtained, as shown in FIG. 3. Each of these 98-bit subcode data is written by the subcode reading circuit 16 into the buffer RAM 18 and temporarily stored therein. Thereafter, the subcode data read from the buffer RAM 18 in response to the instruction from the host computer 19 is output to the host computer 19 through the host interface 15.

The buffer RAM 18 which is connected to the CD-ROM decoder 12 is essentially used for storing the CD-ROM data, but if the capacity of the memory of the buffer RAM 18 is large enough, it is possible to store the CD-ROM data and the subcode data at the same time by dividing the addresses of the storage region. When it is not necessary to deal with the subcode data and the CD-ROM data at the same time, the buffer RAM 18 may be used at different timings for storing the CD-ROM data and storing the subcode data. That is, the buffer RAM 18 is used as a time-sharing memory by which the CD-ROM data is stored at one time and the subcode data is stored at another time. In this case, it is not necessary to divide the addresses of the storage region of the buffer RAM 18, so that it is possible to store the data in the entire storage region each time.

According to the above-described CD-ROM decoder 12, since the CD-ROM decoder 12 itself deals with the subcode data, the control microcomputer 17 for controlling the operation of the CD-ROM decoder 12 need not deal with the subcode data.

Consequently, according to the present invention, the control microcomputer for controlling the operation of the CD-ROM decoder is provided with a throughput large enough for the jobs allotted thereto, and the amount of data to be stored in the control microcomputer is reduced, so that the load applied to the control microcomputer is reduced. It is therefore possible to improve the data-processing speed of the control microcomputer and accommodate an increased amount of data.

Second embodiment

Figure 4:
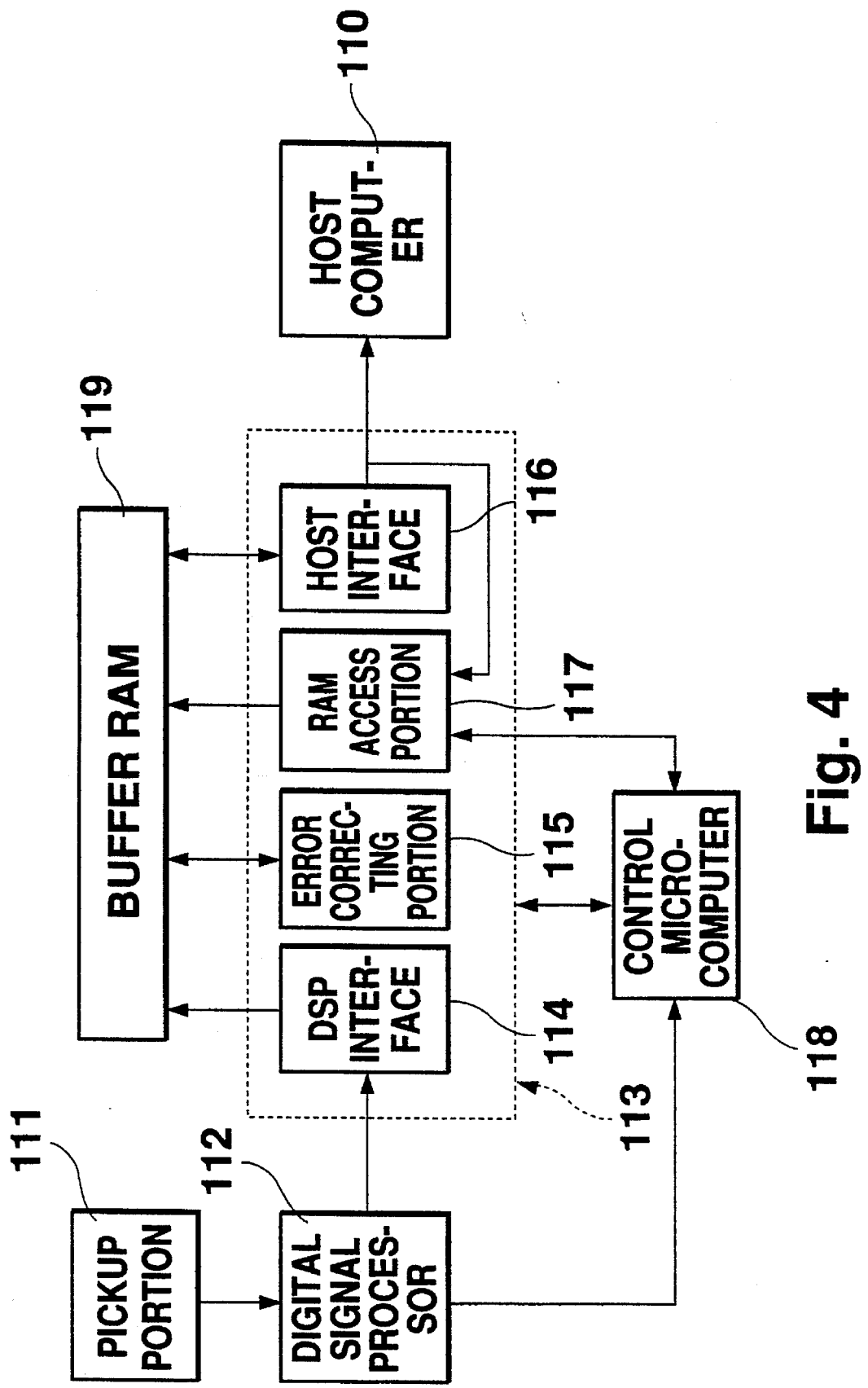
FIG. 4 is a block diagram of the structure of a CD-ROM system utilizing another embodiment of a CD-ROM decoder according to the present invention.

FIG. 4 is a block diagram of a CD-ROM system utilizing another embodiment of a CD-ROM decoder according to the present invention.

A pickup portion 111 works in the same manner as pickup portion 110 as shown in FIG. 1.

A digital signal processor 112 works in the same manner as a digital signal processor 11 in FIG. 1.

The CD-ROM decoder 113 includes a DSP interface 114 for receiving the CD-ROM data, an error correcting portion 115 for detecting and correcting code errors of the CD-ROM data, a host interface 116 for supplying the CD-ROM data to host computer after predetermined processing, and a RAM access portion 117 for fetching a part of the CD-ROM data and writing it to a later-described buffer RAM 119. Each of these elements 114, 115, 116, and 117 is controlled in accordance with the instruction from a control microcomputer 118 so as to operate at a predetermined timing. The DSP interface 114, the error correcting portion 115 and the host interface 116 are the same as those of the CD-ROM decoder 3 shown in FIG. 5. The CD-ROM data which is descrambled by the DSP interface 114 is written into the buffer RAM 119. After code errors of the CD-ROM data are corrected in the error correcting portion 115, the CD-ROM data is output to a host computer 110 through the host interface 116.

The CD-ROM decoder 113 is characterized in that it incorporates the RAM access portion 117 for fetching a part of the CD-ROM data which is transferred from the host interface 116 to the host computer 110 so as to extract specific data from the CD-ROM data and write the specific data to the buffer RAM 119. The CD-ROM data output from the host interface 116 has a format in correspondence with the host computer 110, and the timing for fetching the CD-ROM data by the RAM access portion 117 is set by a program of the control microcomputer 118. In other words, since the control microcomputer 118 controls the operation of each element of the CD-ROM decoder 113 on the basis of the program stored in the ROM which is incorporated thereinto, it is possible to optionally change the timing for fetching the CD-ROM data by the RAM access portion 117 by setting a program in the same way as the operation timings of other elements. It is therefore possible to extract specific data from the CD-ROM data which are transferred from the CD-ROM decoder 113 to the host computer 110 and to freely store the specific data in the buffer RAM 119 for a desired period.

On the other hand, the subcode data which is separated from the CD-ROM data by the digital signal processor 112 is fetched by the control microcomputer 118, temporarily stored in the RAM incorporated thereinto, and transferred from the control microcomputer 118 to the host computer 110 through the host interface 116. Alternatively, the subcode data may be transferred from the control microcomputer 118 to the RAM access portion 117 and stored in the buffer RAM 119. In this way, the subcode data is supplied from the control microcomputer 118 to the CD-ROM decoder 113. It is also possible to provide a subcode data reading circuit within the CD-ROM decoder 113 so as to directly input the subcode data from the digital signal processor 112 to the CD-ROM decoder 113 as in the first embodiment.

According to the CD-ROM decoder 113 of the second embodiment, it is possible to store a necessary part of the CD-ROM data in the buffer RAM 119 which is connected to the CD-ROM decoder 113, so that the scope of application of the CD-ROM decoder 113 is broadened. For example, if the TOC (table of contents) recorded in the innermost periphery of the CD-ROM is stored, it is possible to access the CD-ROM more promptly.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A CD-ROM decoder for receiving digital data which has been subjected to signal processing by a digital signal processor in accordance with a predetermined format, correcting code errors of said digital data, and supplying the corrected data to a host computer, said CD-ROM decoder comprising:

an input interface means for receiving ROM data from said digital signal processor and writing said ROM data into a memory;

a subcode reading means for receiving subcode data from said digital signal processor and writing said subcode data to the memory;

an error correcting means for reading from the memory said ROM data which is written by said input interface means, detecting and correcting code errors of said ROM data, and writing said ROM data into the memory; and an output interface means for reading from said memory said ROM data which is written by said error correcting means and said subcode data which is written by said subcode reading means, and supplying said ROM data and said subcode data to the host computer.

2. A CD-ROM decoder according to claim 1, wherein the addresses of the storage region of the memory means are divided so as to simultaneously store said ROM data and said subcode data.

3. A CD-ROM decoder according to claim 1, wherein the memory is used as a time-sharing memory so as to store either of said ROM data or said subcode data at a time.

4. A CD-ROM decoder for receiving digital data which has been subjected to signal processing by a digital signal processor in accordance with a predetermined format, correcting code errors of said digital data, and supplying the corrected data to a host computer, said CD-ROM decoder comprising:

an input interface means for receiving ROM data from said digital signal processor and writing said ROM data into a memory;

an error correcting means for reading from the memory said ROM data which is written by said input interface means, detecting and correcting code errors of said ROM data, and writing said ROM data into the memory means;

an output interface means for reading from the memory said ROM data which is written by said error correcting means, and supplying said ROM data to the host computer; and a memory access means for receiving a part of said ROM data which is output from said output interface means and writing the received data into the memory means.

* * * * *